(12) United States Patent
Racine

(10) Patent No.: US 6,443,312 B1
(45) Date of Patent: Sep. 3, 2002

(54) SELF-CLEANING FILTER

(75) Inventor: Jean-Pierre Racine, Granby (CA)

(73) Assignee: Tech-O-Filtre Inc., Ste-Cecile-de-Milton (CA)

( * ) Notice: Subject to any disclaimer, the term of this patent is extended or adjusted under 35 U.S.C. 154(b) by 0 days.

(21) Appl. No.: 09/991,678

(22) Filed: Nov. 26, 2001

(51) Int. Cl.⁷ .......................... B01D 29/64; B01D 29/90; B01D 29/94; B01D 35/16
(52) U.S. Cl. ....................... 210/355; 210/106; 210/413; 210/414; 210/767; 210/808
(58) Field of Search ................................. 210/355, 106, 210/413, 414, 808, 767

(56) References Cited

U.S. PATENT DOCUMENTS

| | | |
|---|---|---|
| 1,296,280 A | 3/1919 | Fussell |
| 2,114,778 A | 4/1938 | Fillinger |
| 2,499,457 A | 3/1950 | Buquoi et al. |
| 3,256,994 A | 6/1966 | Koelsch |
| 3,623,607 A | * 11/1971 | Loos |
| 4,632,757 A | 12/1986 | Rosenberg |
| 5,198,111 A | 3/1993 | Davis |
| 5,277,809 A | 1/1994 | Eder |
| 6,030,532 A | 2/2000 | Racine |

FOREIGN PATENT DOCUMENTS

| | | | |
|---|---|---|---|
| DE | 3914326 | * | 11/1989 |
| SU | 1397063 | * | 5/1988 |
| SU | 1493289 | * | 7/1989 |
| SU | 1643050 | * | 4/1991 |

* cited by examiner

Primary Examiner—Thomas M. Lithgow
(74) Attorney, Agent, or Firm—Francois Martineau

(57) ABSTRACT

The self-cleaning filter is used for filtering incoming dirty liquid and distinctly recuperating clean liquid and waste liquid. The filter comprises a housing having an inner chamber defining first and second inner chamber portions, and an outer chamber; a filtering screen mounted to the housing and separating the inner and outer chambers; first and second inlet ports in the housing for allowing dirty liquid to flow respectively into the first and second inner chamber portions; a clean liquid outlet port in the housing for allowing clean liquid to flow out of the outer chamber; first and second waste outlet ports in the housing for allowing waste liquid to flow respectively out of the first and second inner chamber portions; a piston longitudinally movable along the inner chamber and engaging the filtering device for cleaning the filtering device of waste as the piston moves, the piston separating the first and second inner chamber portions; valves controlling liquid flow through the first and second inlet ports and through the first and second waste liquid outlet ports; and a control device for controlling the movement of the piston inside the inner chamber. The piston can move through the inner chamber in a reciprocating motion between a first and a second limit position to expel waste liquid alternately through the first and second waste outlet ports, and the valve means will allow either one of:

a) dirty liquid to flow into the first inner chamber portion and waste liquid to flow out of the second waste outlet port; and b) dirty liquid to flow into the second inner chamber portion and waste liquid to flow out of the first waste outlet port.

9 Claims, 8 Drawing Sheets

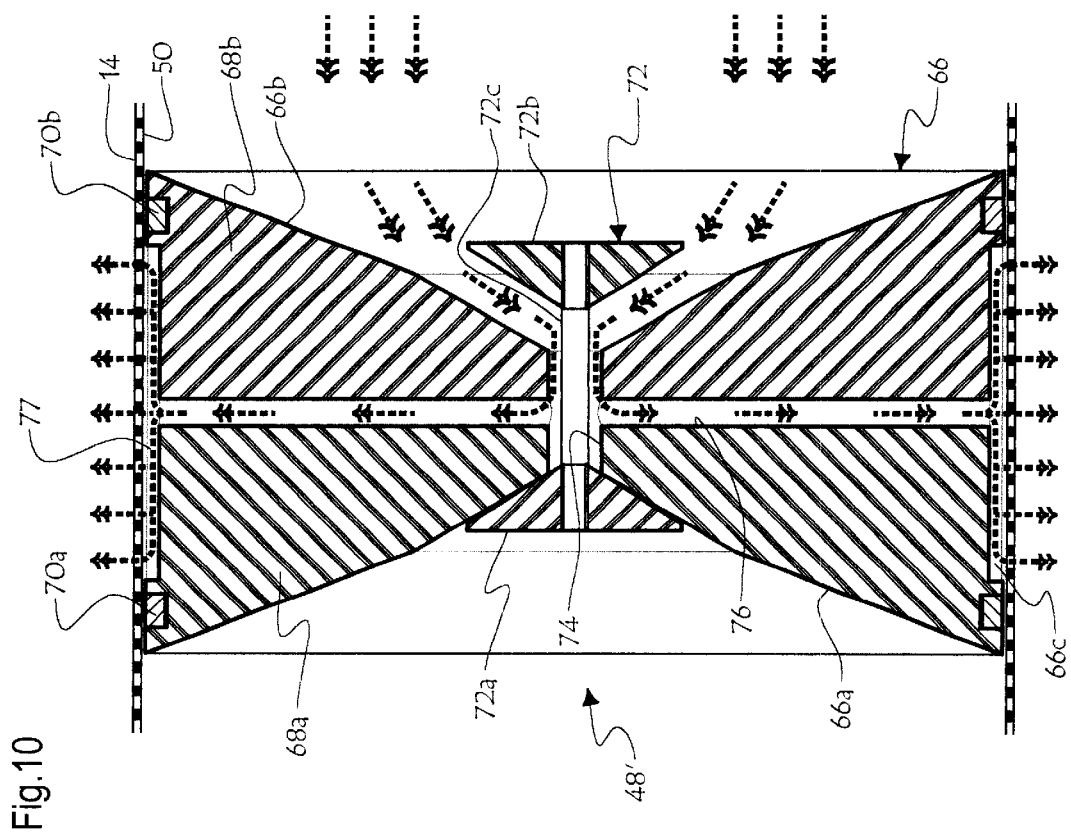
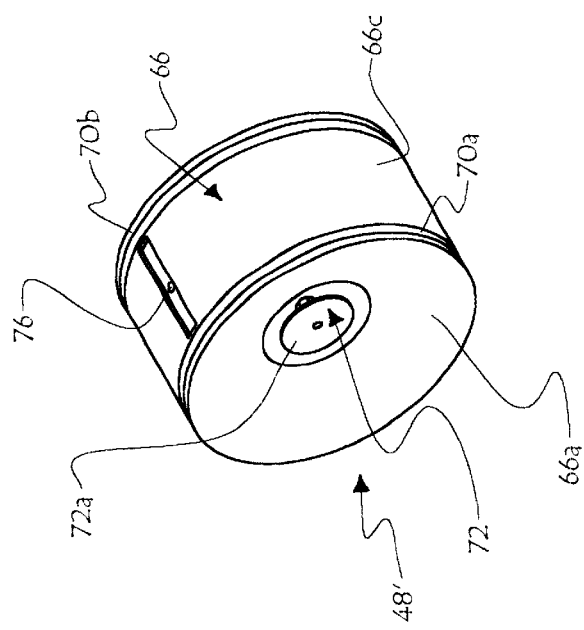

SELF-CLEANING FILTER

FIELD OF THE INVENTION

The present invention relates to liquid filters, and more particularly to a self-cleaning liquid filter.

BACKGROUND OF THE INVENTION

Filters used for filtering liquids come in many shapes and sizes. Often, a filtering screen or a filtering film is used in the filter, with a porosity which depends on the desired filtration quality. This film or screen needs to be cleaned for removal therefrom of macroparticulate debris or waste which are filtered from the liquid and which remain on the screen or film surface. Indeed, this gradually accumulating debris can eventually clog the filtering screen or film, preventing macro-particle-laden or dirty liquid from flowing through the screen or film. However, cleaning the screen or film can be time-consuming and complicated, as the filtering operations often have to be stopped while cleaning is underway, and the filter often has to be opened and partly disassembled to allow one to reach the filtering screen or film for cleaning purposes.

SUMMARY OF THE INVENTION

The present invention relates to a self-cleaning filter for filtering incoming dirty liquid and distinctly recuperating clean liquid and waste liquid, comprising:

- a housing having an elongated inner chamber defining first and second inner chamber portions, and an outer chamber;
- a filtering device mounted to said housing and separating said inner and outer chambers, for allowing dirty liquid in said inner chamber to be filtered by flowing through said filtering device to form clean liquid in said outer chamber, leaving waste in said inner chamber;
- first and second inlet ports in said housing for allowing dirty liquid to flow respectively into said first and second inner chamber portions;
- a clean liquid outlet port in said housing for allowing clean liquid to flow out of said outer chamber;
- first and second waste outlet ports in said housing for allowing waste liquid to flow respectively out of said first and second inner chamber portions;
- a piston longitudinally movable along said inner chamber and engaging said filtering device for cleaning said filtering device of waste as said piston moves, said piston separating said first and second inner chamber portions whereby said first and second inner chamber portions have a variable dimension depending on the position of said piston;
- valve means controlling liquid flow through said first and second inlet ports and through said first and second waste liquid outlet ports; and
- piston control means for controlling the movement of said piston inside said inner chamber;

wherein said piston can move through said inner chamber in a reciprocating motion between a first and a second limit position to expel waste liquid alternately through said first and second waste outlet ports, and wherein said valve means will allow either one of:

a) dirty liquid to flow into said first inner chamber portion and waste liquid to flow out of said second waste outlet port; and b) dirty liquid to flow into said second inner chamber portion and waste liquid to flow out of said first waste outlet port.

The present invention also relates to a self-cleaning filter for filtering incoming dirty liquid and distinctly recuperating clean liquid and waste liquid, comprising:

- a housing having an elongated inner chamber defining first and second inner chamber portions, and an outer chamber;
- a filtering device mounted to said housing and separating said inner and outer chambers, for allowing dirty liquid in said inner chamber to be filtered by flowing through said filtering device to form clean liquid in said outer chamber, leaving waste in said inner chamber;
- first and second inlet ports in said housing for allowing dirty liquid to flow respectively into said first and second inner chamber portions;
- a clean liquid outlet port in said housing for allowing clean liquid to flow out of said outer chamber;
- first and second waste outlet ports in said housing for allowing waste liquid to flow respectively out of said first and second inner chamber portions;
- a piston longitudinally movable along said inner chamber between a first and a second limit position and engaging said filtering device for cleaning said filtering device of waste as said piston moves, said piston separating said first and second inner chamber portions whereby said first and second inner chamber portions have a variable dimension depending on the position of said piston;
- a control device;
- first and second inlet control valves controlled by said control device and respectively linked to said first and second inlet ports for controlling liquid flow through said first and second inlet ports;
- first and second outlet control valves controlled by said control device and respectively linked to said first and second waste outlet ports for controlling liquid flow through said first and second waste outlet ports; and
- first and second pressure sensors linked to said control device and respectively located in said first and second inner chamber portions for measuring the pressure in said first and second inner chamber portions;

wherein said piston will move through said inner chamber in a reciprocating motion for expelling waste liquid alternately through said first and second waste outlet ports upon determined pressure differentials being reached between said first and second inner chamber portions, and wherein said control device will control the openings of said first and second inlet control valves and of said first and second outlet control valves so as to create desired pressure differentials in said first and second inner chambers to ensure a reciprocating motion of said piston in said inner chamber to clean said filtering device and to ensure expulsion of waste liquid through said first and second waste outlet ports.

Preferably, said filtering device is a filtering screen.

Preferably, said filtering screen comprises a rigid perforated support structure and a porous film applied against said support structure.

Preferably, said inner chamber is cylindrical and is circumscribed by said filtering screen which is also cylindrical, said outer chamber being located around said inner chamber, being toroidal and being circumscribed by said housing which is also cylindrical.

Preferably, said piston is generally cylindrical and comprises a filtering device engaging peripheral surface and a pair of opposite end surfaces that are inwardly concave.

Preferably, said piston comprises an axial channel defining two extremities and axially extending through said piston, and a plunger movable in said axial channel and having a pair of opposite seats, with either one of said seats being engageable against a corresponding said piston end surface to close a corresponding said axial channel extremity, said piston further comprising at least one radial channel radially extending through said piston between said axial channel and said peripheral surface.

Preferably, said piston comprises a pair of opposite frustoconical, outwardly convex, back-to-back surfaces linked at a common annular filtering device engaging edge.

Preferably, said piston further comprises a pair of stabilizers on opposite sides thereof.

The present invention also relates to a method of filtering incoming dirty liquid and distinctly recuperating clean liquid and waste liquid with a self-cleaning filter, the filter comprising:

- a housing having an elongated inner chamber defining first and second inner chamber portions, and an outer chamber;
- a filtering device mounted to the housing and separating the inner and outer chambers thereof;
- first and second inlet ports in the housing for allowing dirty liquid to flow respectively into the first and second inner chamber portions;
- a clean liquid outlet port in the housing for allowing clean liquid to flow out of the outer chamber;
- first and second waste outlet ports in the housing for allowing waste liquid to flow respectively out of the first and second inner chamber portions;
- a piston longitudinally movable along the inner chamber between a first and a second limit position and engaging the filtering device for cleaning the filtering device of waste as the piston moves, the piston separating the first and second inner chamber portions whereby the first and second inner chamber portions have a variable dimension depending on the position of the piston;
- a control device;
- first and second inlet control valves controlled by the control device and respectively linked to the first and second inlet ports for controlling liquid flow through the first and second inlet ports;
- first and second outlet control valves controlled by the control device and respectively linked to the first and second waste outlet ports for controlling liquid flow through the first and second waste outlet ports; and
- first and second pressure sensors linked to the control device and respectively located in the first and second inner chamber portions for measuring the pressure in the first and second inner chamber portions;

wherein said method comprises the following steps:

a) allowing dirty liquid to flow in the first inner chamber portion through the first inlet port;

b) allowing the dirty liquid in the first inner chamber portion to flow through the filtering device to form clean liquid in the outer chamber, leaving waste in the first inner chamber portion, whereby pressure in the first inner chamber portion will rise as the filtering device gradually becomes obstructed;

c) moving the piston towards the second limit position to increase the size of the first inner chamber portion and to free a clean filtering device portion in the first inner chamber portion upon the pressure in the first inner chamber portion reaching a determined value, whereby the pressure in the first inner chamber portion will remain approximately equal to said determined value;

d) allowing waste liquid in the second inner chamber portion to be evacuated through the second waste liquid outlet port only when the pressure in the second inner chamber portion is equal to or greater than an outlet threshold pressure value;

e) upon the piston reaching the second limit position, allowing the pressure in the first inner chamber portion to rise beyond said determined value;

f) upon an inlet threshold pressure value being reached in the first inner chamber portion, preventing dirty liquid to flow into the first inner chamber portion and allowing dirty liquid to flow into the second inner chamber portion through the second inlet port;

g) allowing the dirty liquid in the second inner chamber portion to flow through the filtering device to form clean liquid in the outer chamber, leaving waste in the second inner chamber portion, whereby pressure in the second inner chamber portion will rise as the filtering device gradually becomes obstructed;

h) moving the piston towards the first limit position to increase the size of the second inner chamber portion and to free a clean filtering device portion in the second inner chamber portion upon the pressure in the second inner chamber portion reaching a determined value, whereby pressure in the second inner chamber portion will remain approximately equal to said determined value;

i) allowing waste liquid in the first inner chamber portion to be evacuated through the first waste liquid outlet port only when the pressure in the first inner chamber portion is equal to or greater than the outlet threshold pressure value;

j) upon the piston reaching the first limit position, allowing the pressure in the second inner chamber portion to rise beyond said determined value;

k) upon the inlet threshold pressure value being reached in the second inner chamber portion, preventing dirty liquid to flow into the second inner chamber portion and allowing dirty liquid to flow into the first inner chamber portion through the first inlet port;

l) repeating steps (a) to (k) until no more dirty liquid is desired to be filtered; and m) continuously collecting clean liquid from the outer chamber through the clean liquid outlet port.

DESCRIPTION OF THE DRAWINGS

In the annexed drawings:

FIGS. 9 and 10 are respectively a perspective view and a cross-sectional view of a filter cleaning piston according to a second embodiment of the invention, with FIG. 10 being at an enlarged scale and additionally showing the portion of the filter screen adjacent to the piston.

DETAILED DESCRIPTION OF THE EMBODIMENTS

Figure 1:
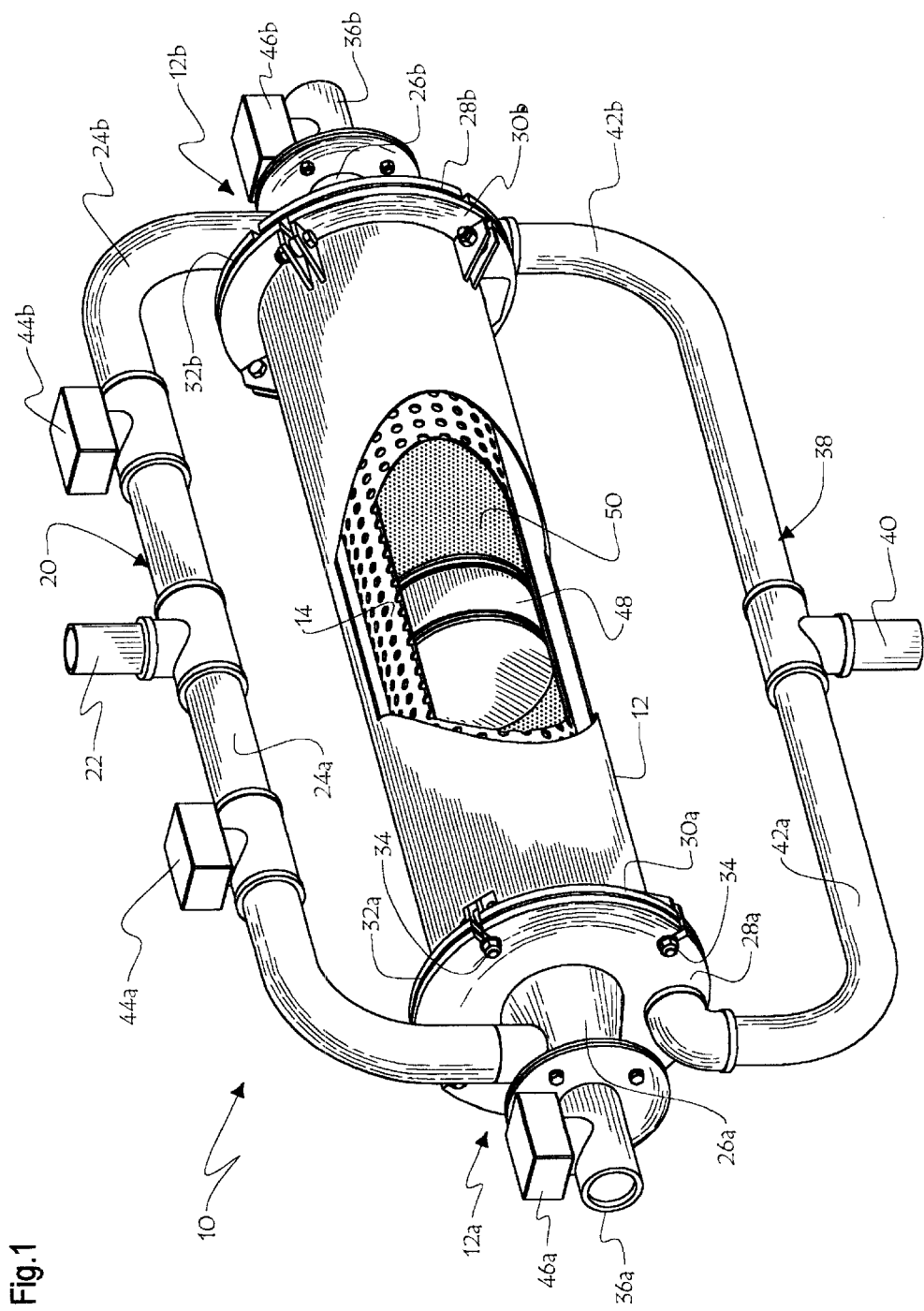
FIG. 1 is a perspective view of the filter of the present invention, with a portion of the filter housing and a portion of the filtering screen being removed to show the filter inner chamber and the cleaning piston.
Figure 2:
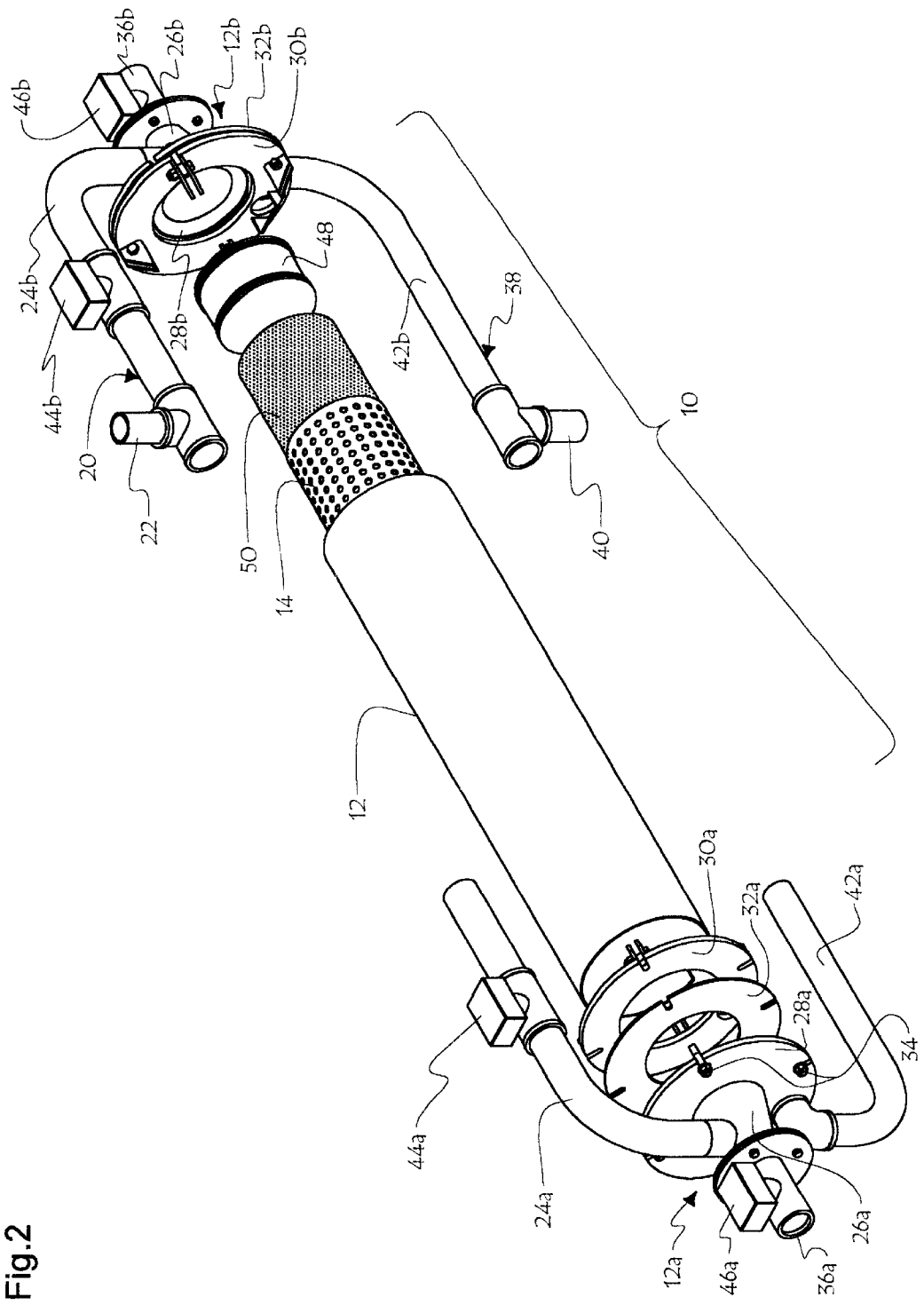
FIG. 2 is an exploded perspective view of the filter of FIG. 1.
Figure 3:
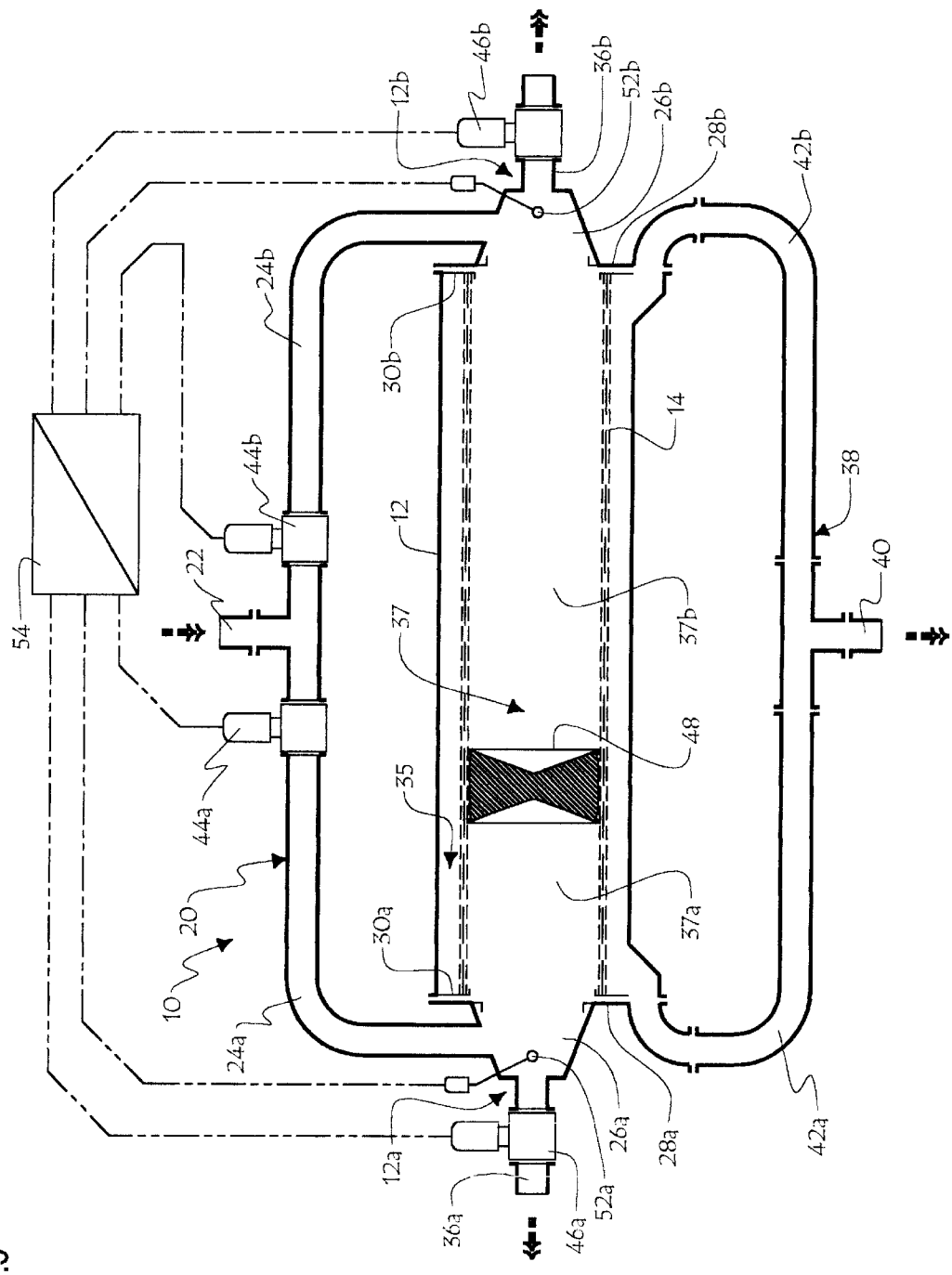
FIG. 3 is a schematic longitudinal cross-sectional elevation of the filter of FIG.

FIGS. 1–3 show a self-cleaning filter 10 according to the present invention. Filter 10 comprises a horizontally disposed cylindrical housing 12 having first and second ends 12a, 12b. A perforated cylinder or screen 14 having a smaller diameter than housing 12, is coaxially installed inside housing 12, with housing 12 and screen 14 being radially spaced-apart.

A Y-shaped dirty liquid inlet tube 20 has a main inlet portion 22 connected to a dirty liquid source (not shown) feeding dirty liquid to be filtered. Main inlet portion 22 is also connected to co-extensive first and second elbowed branches 24a, 24b that are in turn connected to first and second frusto-conical caps 26a, 26b. Caps 26a, 26b are respectively connected by their integral peripheral flanges 28a, 28b with bolts 34 to first and second annular flanges 30a, 30b that are in turn fixed to cylinder 12 at its first and second ends 12a, 12b respectively. Annular elastomeric seals 32a and 32b are respectively installed between flanges 28a, 30a and 28b, 30b. FIG. 2 shows that the cap flanges 28a, 28b radially inwardly protrude relative to annular flanges 30a, 30b, so as to form inwardly protruding annular shoulders in casing 12 near its extremities 12a, 12b.

FIG. 3 shows that screen 14 extends longitudinally inside cylinder 12 between annular flanges 30a, 30b to which it is attached, so as to separate the toroidal volume forming an outer chamber 35 and located around screen 14, from the cylindrical volume located inside screen 14 and forming a cylindrical inner chamber 37 that extends into hollow caps 26a, 26b. The inlet tube first and second branches 24a, 24b, defining dirty liquid inlet ports, are thus in fluid communication with the filter inner chamber 37, which may in turn fluidingly communicate with outer chamber 35 through screen 14. In fact, liquid located in inner chamber 37 can only access outer chamber 35 through cylindrical screen 14.

As illustrated in FIGS. 1–3, filter 10 comprises first and second waste outlet tubes 36a, 36b connected to first and second caps 26a, 26b. Waste outlet tubes 36a, 36b are connected to a suitable waste disposal facility (not shown). Filter 10 also comprises a Y-shaped clean liquid outlet tube 38 that has a main outlet portion 40 which is connected to coextensive first and second elbowed branches 42a, 42b. Tube branches 42a and 42b are fluidingly connected to the cylinder outer chamber 35, and more specifically through the lower portion of flanges 28a, 30a, annular seals 32a, 32b and flanges 28b, 30b. Main outlet portion 40 is also connected to a suitable clean liquid recuperation facility (not shown).

First and second inlet control valves 44a, 44b are provided on the inlet tube first and second branches 24a, 24b. Also, first and second outlet control valves 46a, 46b are provided on the waste outlet tubes 36a, 36b.

A piston 48 is installed inside screen 14 and can reciprocatingly move axially therein between two opposite limits positions in which piston 48 abuts against the radially inwardly protruding shoulders of cap flanges 28a and 28b, respectively. When moving inside screen 14, piston 48 sealingly slides along the inner surface of screen 14 and rakes and pushes any debris in screen 14 towards a corresponding one of the cylinder ends 12a, 12b.

A removable filtering film 50 is applied against the inner surface of screen 14, to allow for a selected filtering capacity by choosing a film 50 having a desired porosity. Thus, screen 14 in fact acts as a support structure for film 50, although a suitable filtering screen 14 lacking a filtering film could also be envisioned. A film 50 which is independent from the screen support structure 14 has the advantage of being more easily removable and replaceable, either to install a new film when the old one is worn or damaged, or to change the porosity of the filtering process.

Pressure sensors 52a, 52b (FIG. 3) are provided in end caps 26a, 26b and are linked to a programmed electronic control device 54 which is linked to and commands valves 44a, 44b, 46a and 46b. Control device 54 can be for example a programmable automaton or a computer.

In use, the purpose of filter 10 is to filter dirty liquid being fed through the inlet tube main portion 22. Clean liquid will be expelled out through main outlet tube 40, and waste liquid will be expelled through waste outlet tubes 36a, 36b. The waste liquid will be formed of the waste or debris retained by screen 14 and film 50, and by a certain proportion of dirty liquid. Preferably, the proportion of dirty liquid expelled will be as low as possible.

As shown sequentially in FIGS. 3 to 6, dirty liquid can be filtered while the inner surface of film 50 will be cleaned by reciprocating piston 48. At any given time, incoming dirty liquid will be directed to either one of inlet tube branches 24a and 24b, but never to both at the same time. This selective liquid inlet flow orientation is controlled by control device 54 which commands inlet control valves 44a, 44b accordingly, as detailed hereinafter. Also, at any given time, waste liquid flows out through either one of waste outlet tubes 36a and 36b, or through none of them, but in any event never through both at the same time. This selective waste liquid outlet flow orientation is also controlled by control device 54 which commands outlet control valves 46a, 46b accordingly, as also detailed hereinafter. Finally, filtered liquid continuously flows out through outlet tube 38 during the filtration process.

In an initial condition of filter 10, first inlet control valve 44a is opened, second inlet control valve 44b and outlet control valves 46a and 46b are closed, and piston 48 is positioned as shown in FIG. 3 (although it could be positioned elsewhere—this initial position being chosen for the purposes of the present explanation). The housing inner chamber 37 is sealingly divided into two portions by piston 48, a left-hand side (in the annexed drawings) first inner chamber portion 37a, and a right-hand side second inner chamber portion 37b.

Dirty liquid starts to flow from main inlet tube 22 through first inlet tube branch 24a, the hollow first cap 26a and into the first inner chamber portion 37a. Once it is in first inner chamber portion 37a, the liquid flows into the housing outer chamber 35 through film 50 and screen 14, being filtered in the process to form clean liquid in outer chamber 35. The clean liquid then flows through outlet tube 38, through both branches 42a and 42b, to be conveyed to a suitable clean liquid receiving area.

Figure 4:
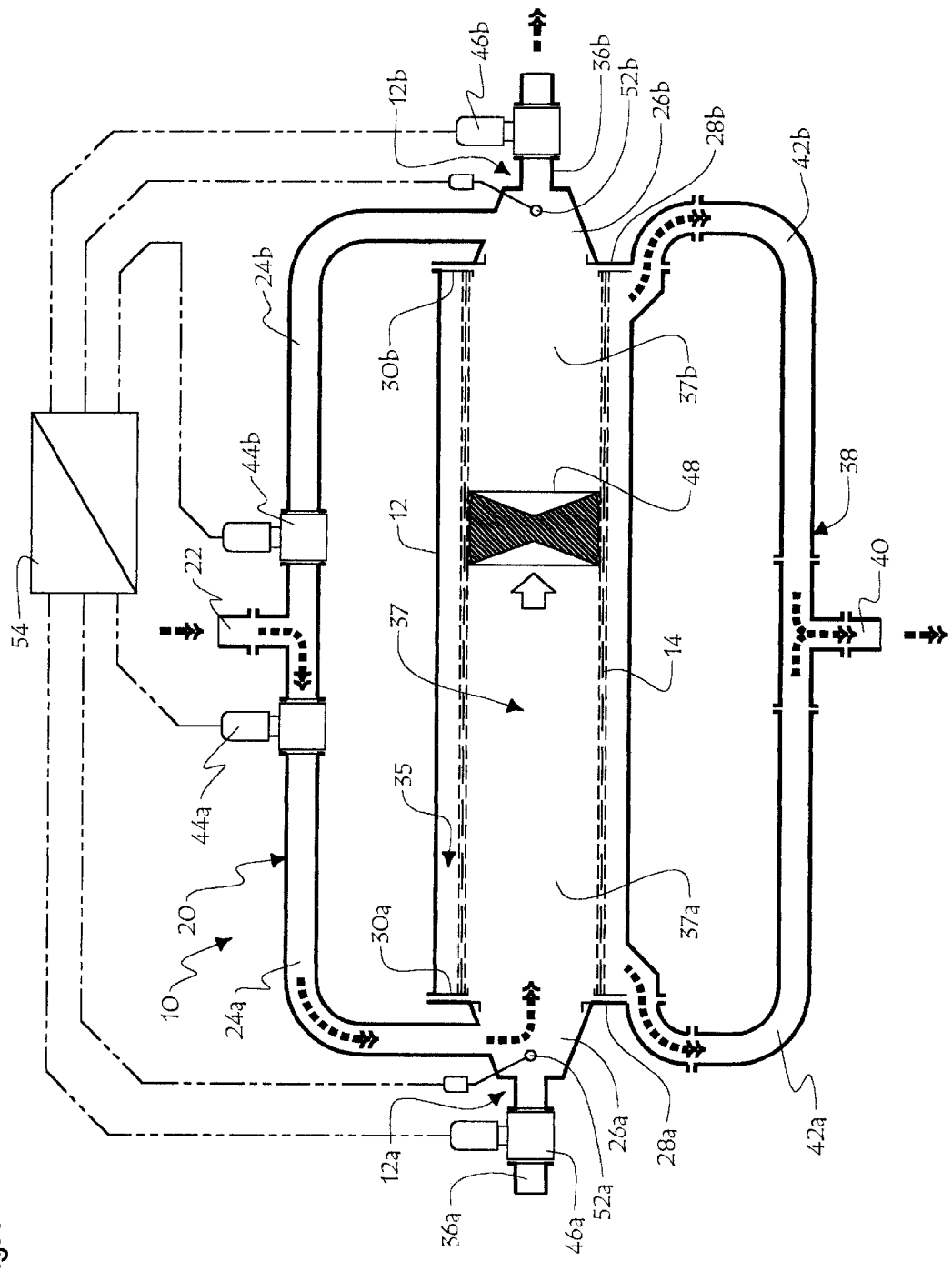
FIGS. 4–6 are views similar to FIG. 3, sequentially suggesting the liquid flow directions in the filter together with corresponding piston positions and movement directions.

As waste or debris accumulate on the inner surface of film 50 during liquid filtration, the latter gradually becomes obstructed, thus reducing the rate at which liquid flows towards the housing outer chamber 35. As a consequence of this reduced outgoing liquid flow rate in first inner chamber portion 37a, the incoming liquid flow rate eventually becomes greater than the outgoing liquid flow rate, and pressure gradually rises inside first inner chamber portion 37a. At one point, pressure inside first inner chamber portion 37a becomes sufficient to overcome the friction forces retaining piston 48, and the latter is pushed towards the right-hand side, as shown in FIG. 4.

As piston 48 moves towards second waste outlet tube 36b, a clean filtering film portion is freed where piston 48 has vacated film 50 in first inner chamber portion 37a. This allows liquid to flow therethrough, still being filtered in the process. Eventually, this clean filtering film portion also becomes obstructed, pressure rises in first inner chamber portion 37a, and piston 48 is again pushed towards second waste outlet tube 36b, freeing a new clean film portion.

Figure 5:
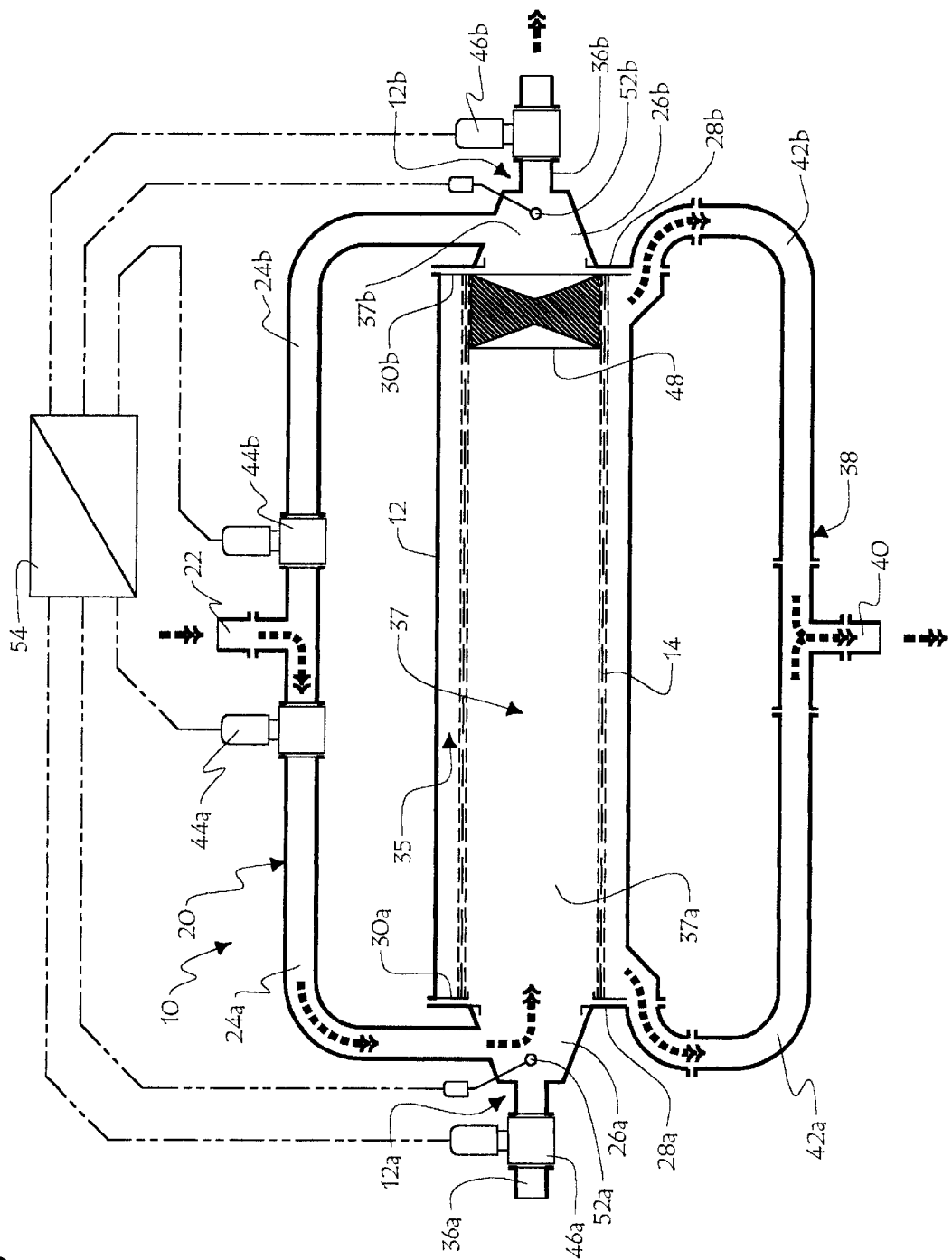

Piston 48 thus moves towards the right-hand side until it abuts against the annular shoulder formed by the radially inwardly protruding portion of the second cap flange 28b, as shown in FIG. 5. At this point, dirty liquid continues to flow into first inner chamber portion 37a. However, as dirty liquid continues to flow into first inner chamber portion 37a, the pressure therein rises even more, eventually reaching an inlet threshold value as measured by the first sensor 52a.

Once this inlet threshold pressure value is reached in the first inner chamber portion 37a, control device 54 commands first inlet control valve 44a to close and second inlet control valve 44b to open. Dirty liquid consequently flows into second inner chamber portion 37b (now only including the hollow cap 26b portion). Also, as the inlet valves are switched, control device 54 reads the pressure in first inner chamber portion 37a with first sensor 52a, and compares it to a determined outlet threshold pressure value, which is much lesser than the inlet threshold pressure value; thus, since the pressure in first inner chamber is greater than the outlet threshold pressure value, first outlet control valve 46a is commanded to open by control device 54, and waste liquid pours out into first waste outlet tube 36a, until the pressure in first inner chamber portion 37a reaches the outlet threshold pressure value. From then on, first outlet control valve 46a only opens to allow outflow of waste liquid if the pressure measured in first inner chamber portion 37a is greater than the outlet threshold pressure value, and otherwise remains closed.

Figure 6:
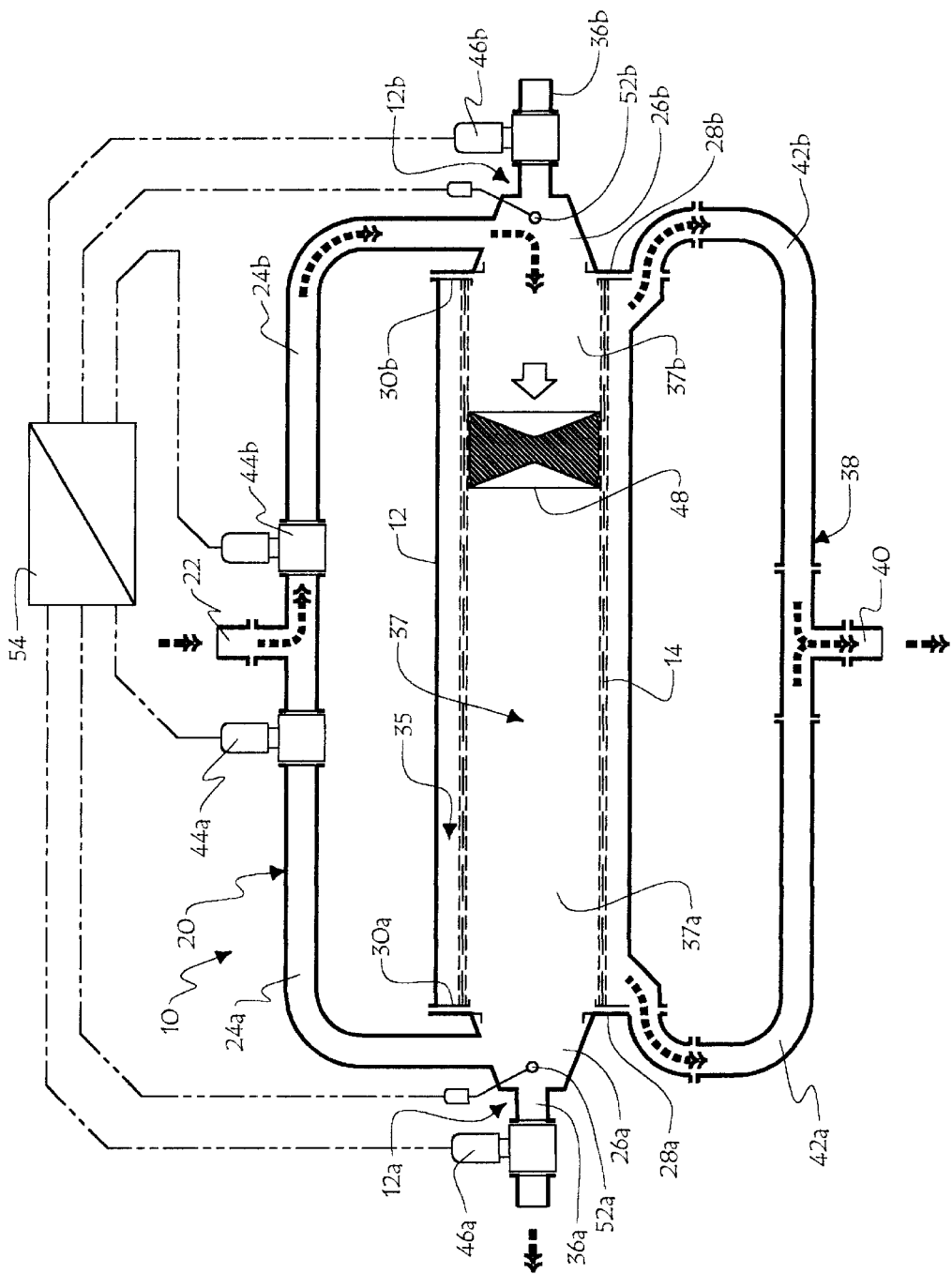

Piston 48 gradually moves towards the left-hand side, as shown in FIG. 6, as the pressure increases in second inner chamber portion 37b due to waste at least partly obstructing film 50 in second inner chamber portion 37b through the filtering of liquid through film 50. The process is thus repeated, although piston 48 now moves in the opposite direction.

As it is gradually displaced towards the left-hand side, piston 48 will this time not only vacate a clean film portion. Indeed, piston 48 will also rake the inner surface of filtering film 50 in the first inner chamber portion 37a which is filled with waste, and will push waste in the first inner chamber portion 37a towards first waste outlet tube 36a, consequently maintaining, in combination with the regulated outflow of waste liquid through first outlet control valve 46a, the pressure in first inner chamber portion 37a near the outlet threshold pressure value.

It is understood that a certain amount of liquid is expelled with the debris out through waste outlet tubes 36a, 36b, often forming a mud-like liquid.

Piston 48 continues to be pushed towards first waste outlet tube 36a, with waste liquid being either continuously (especially if the waste liquid is very homogeneous) or sporadically expelled through first waste outlet tube 36a, until piston 48 abuts against the annular shoulder formed by the radially inwardly protruding portion of the first cap flange 28a. At this point, dirty liquid continues to flow into second inner chamber portion 37b, although the first outlet control valve 46a remains closed since pressure in the first inner chamber portion 37a (now only including the hollow cap 26a portion) then stops to increase due to the now motionless piston 48. However, as liquid continues to flow into second inner chamber portion 37b, the pressure therein rises even more, eventually reaching the inlet threshold value as measured by the second sensor 52b.

Once this inlet threshold value is reached in the first inner chamber portion 37a, control device 54 will command second inlet control valve 44b to close and first inlet control valve 44a to open. The cycle is thus re-started, although this time the second inner chamber portion 37b is already filled with waste, which will be initially partly emptied through waste outlet tube 36b until the pressure inside second inner chamber portion 37b decreases to a value near the outlet threshold pressure value. The waste will then be gradually raked and pushed out through second waste outlet tube 36b by piston 48, as explained hereinabove in the case of the waste in first inner chamber portion 37a.

Thus, through the programmed control device 54 which commands valves 44a, 44b, 46a, 46b according to the pressure measured in the first and second inner chambers 37a, 37b, liquid can be filtered efficiently, with the filter inner surface being cleaned by the reciprocating movement of piston 48.

Tests have been accomplished wherein the outlet threshold pressure value was set at 20 pounds per square inch (psi) and the inlet threshold pressure value was set at 60 psi. The pressure required for the piston to be moved was approximately 40 psi. A 20 psi pressure differential between the first and second inner chamber portions 37a, 37b was consequently necessary to overcome the friction forces applied against piston 48 to make it move.

It is noted that the inlet and outlet threshold pressure values are calibrated according to the pressure required to overcome the friction force exerted on piston 48 according to the specific nature of the liquid to be filtered, and that while piston 48 moves along inner chamber 37 in one direction, a pressure equilibrium sets up in both the first and second inner chambers 37a and 37b. Indeed, the dirty liquid flowing into first inner chamber portion 37a, for example, will not increase the pressure in first inner chamber portion 37a above a certain pressure value, for example 40 psi. Indeed, as soon as the pressure in first inner chamber rises sufficiently to move piston 48, the latter will free a clean film portion which will allow the liquid to flow therethrough, and the size of the first inner chamber portion 37a will increase: the liquid flow out of first inner chamber portion 37a and this size increase of first inner chamber portion 37a will effectively participate in reducing the pressure in first inner chamber portion 37a. On the other hand, additional dirty liquid flowing into inner chamber portion 37a will participate to increase the pressure therein. Consequently, the pressure generally stabilizes at a determined value, for example 40 psi. Meanwhile, in second inner chamber portion 37b, the pressure substantially stabilizes at the outlet threshold pressure value, as explained hereinabove, for example 20 psi. This pressure equilibrium is maintained while piston 48 moves along inner chamber 37, until piston 48 abuts against one of the shoulders formed by flanges 28a, 28b.

Figure 7:
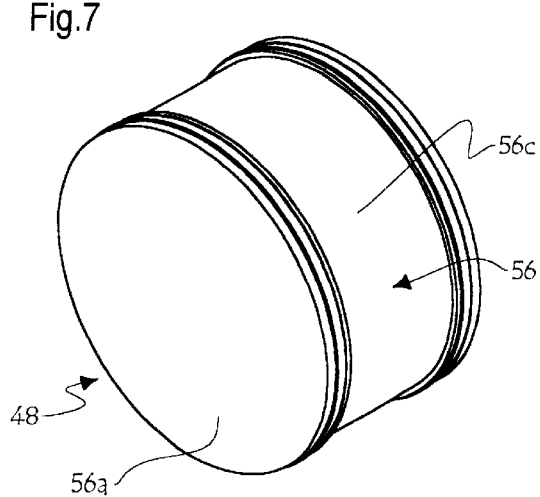
FIGS. 7 and 8 are respectively a perspective view and a cross-sectional view of a filter cleaning piston according to a first embodiment of the invention.
Figure 8:
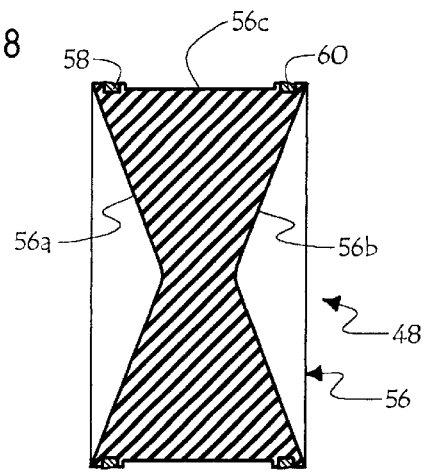

FIGS. 7 and 8 show piston 48, according to one embodiment of the present invention. It can be seen that piston 48 comprises a main body 56, which can be made of nylon according to one embodiment, and which has a generally cylindrical shape defining inwardly concave first and second conical sides 56a and 56b and a peripheral surface 56c. The concave conical surfaces 56a, 56b register with the housing first and second inner chambers 37a and 37b respectively, and provide a greater surface area for enhanced effect of the pressure applied by the liquid on piston 48, and a centrally concentrated pressure gradient applied by the piston on the waste liquid during waste ejection. Piston 48 also comprises a pair of spaced-apart annular elastomeric seals 58, 60 provided in annular grooved ribs 62, 64 integrally formed on the axial extremities of peripheral surface 56c.

FIGS. 9 and 10 show a piston 48' according to a second embodiment of the invention. Piston 48' is similar to the first embodiment of the piston 48, having a generally cylindrical main body 66 defining a peripheral surface 66c and two inwardly concave conical end surfaces 66a, 66b, and also having peripheral grooved ribs 68a, 68b housing annular seals 70a, 70b. Piston 48' furthermore comprises a plunger 72 made of a central rod 72c having opposite conical seats 72a, 72b, with rod 72c being axially movable through an axial channel 74 made centrally through piston 48', so as to act as a valve. Plunger rod 72c is diametrally smaller than axial channel 74 so as to provide a radial play around rod 72c. Also, at least one radial channel, for example two radial channels 76, radially extend between axial channel 74 and peripheral surface 66c, and are centrally disposed relative to end surfaces 66a and 66b, so as to allow liquid to flow from axial channel 74 towards the peripheral groove 77 formed between ribs 68, 70, outer surface 66c and film 50. Piston 48' can be used instead of the first embodiment of piston 48, especially when the dirty liquid includes a lesser proportion of solids or smaller solid particles.

In use, as shown more particularly in FIG. 10, when piston 48' abuts against a housing cap flange, for example second cap flange 28b, the pressure rises on the left-hand side of piston 48' in first inner chamber portion 37a until the pressure reaches the inlet threshold value, as described hereinabove. Control device 54 then switches the active inlet control valves, so that the second inlet control valve 44b becomes active and the first inlet control valve 44a, inactive. Dirty liquid then flows into second inner chamber portion 37b while the pressure remains higher in first inner chamber portion 37a. In such a case, plunger 72 will be pushed towards the right-hand side as shown in FIG. 10, due to the greater pressure on the left-hand side of piston 48'. Seat 72a will consequently block axial channel 74 on the left-hand extremity thereof, while seat 72b will clear the opening of axial channel 74. Incoming liquid will consequently be allowed to flow from second inner chamber portion 37b through channel 74 around plunger rod 72c, then radially outwardly through radial channels 76, 76 into groove 77, where it will be expelled through film 50 and screen 14, being filtered in the process.

It is understood that if the dirty liquid were to have an important concentration of solids or large solid particles, then piston 48' would not be appropriate since these solids would remain in groove 77, eventually clogging the diametral channel 76 and rendering same useless, in addition to increasing the friction force between piston 48' and film 50 due to the presence of solid particles trapped in groove 77.

Figure 11:
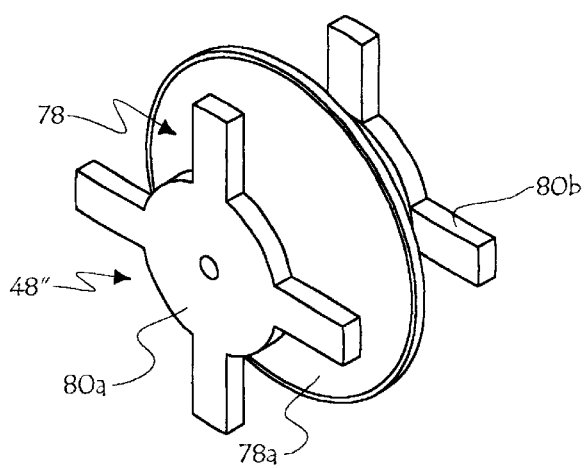
FIGS. 11 and 12 are respectively a perspective view and a cross-sectional view of a filter cleaning piston according to a third embodiment of the invention.
Figure 12:
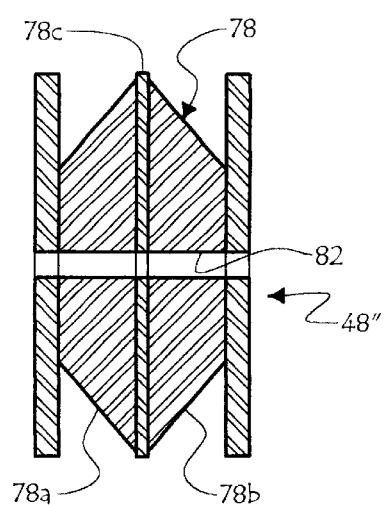

FIGS. 11–12 show a third embodiment of a piston 48" according to the present invention. Piston 48" comprises a main body 78 having a pair of outwardly convex frusto-conical end surfaces 78a, 78b and a relatively thin peripheral edge 78c. A pair of cross-shaped rigid stabilizers 80a, 80b are installed on corresponding end surfaces 78a, 78b of main body 78 by means of a bolt (not shown) extending through stabilizers 80a, 80b and an axial bore 82 made in main body 78. Piston 48" is used when the waste on film 50 is particularly tough to remove, since the thinner raking edge 78c concentrates the raking force instead of it being spread out on a larger surface such as the one of pistons 48 and 48' of the first two embodiments. Stabilizers 80a, 80b are provided to prevent piston 48" from tilting on one side or the other due to the otherwise unstable engagement of the thin edge 78c against screen 14.

In the embodiment shown in the drawings, the support screen 14 and filtering film 50 are shown as being two distinct elements. However, it is understood that any suitable filtering device with required filtering features could be used.

In the embodiment of the invention shown in the drawings, the filter is positioned horizontally. This is desirable since it facilitates the clean liquid collection in outer chamber 35. If the filter were to be positioned vertically or in a vertically inclined fashion, some configuration changes and pressure-related calibrations would have to be made to ensure a proper working of filter 10, although a workable vertical filter could be obtained according to the present invention.

In one embodiment of the invention, filter 10 is used in combination with another centrifugal filter that can separate denser solids from liquids and consequently extract a high concentration of solids. In this embodiment comprising the combination of filter 10 with a centrifugal filter, the dirty liquid is initially directed into the centrifugal filter, where the denser solids are recuperated and where a cleaned liquid outlet port is connected to the dirty liquid inlet port 22 of filter 10. The liquid exiting the centrifugal filter is directed into filter 10 through its dirty liquid inlet tube, where it is filtered as described hereinabove, to recuperate clean liquid. Both the waste liquid outlet ports 36a and 36b of filter 10 are connected to tubes that convey the waste liquid back into the centrifugal filter, where the mud-like waste liquid is separated to extract waste solids and to recuperate the liquid therefrom, the liquid being redirected through filter 10 again. Consequently, with these two serially connected filters, the global dirty liquid inlet port is connected to the centrifugal filter, the global waste outlet port is also connected to the centrifugal filter, while the global clean liquid outlet port is connected to the self-cleaning filter 10.

I claim:
1. A method of filtering incoming dirty liquid and distinctly recuperating clean liquid and waste liquid with a self-cleaning filter, the filter comprising:
   a housing having an elongated inner chamber defining first and second inner chamber portions, and an outer chamber;
   a filtering device mounted to the housing and separating the inner and outer chambers thereof,
   first and second inlet ports in the housing for allowing dirty liquid to flow respectively into the first and second inner chamber portions;
   a clean liquid outlet port in the housing for allowing clean liquid to flow out of the outer chamber;
   first and second waste outlet ports in the housing for allowing waste liquid to flow respectively out of the first and second inner chamber portions;
   a piston longitudinally movable along the inner chamber between a first and a second limit position and engaging the filtering device for cleaning the filtering device of waste as the piston moves, the piston separating the first and second inner chamber portions whereby the first and second inner chamber portions have a variable dimension depending on the position of the piston;

a control device;

first and second inlet control valves controlled by the control device and respectively linked to the first and second inlet ports for controlling liquid flow through the first and second inlet ports;

first and second outlet control valves controlled by the control device and respectively linked to the first and second waste outlet ports for controlling liquid flow through the first and second waste outlet ports; and first and second pressure sensors linked to the control device and respectively located in the first and second inner chamber portions for measuring the pressure in the first and second inner chamber portions;

wherein said method comprises the following steps:

a) allowing dirty liquid to flow in the first inner chamber portion through the first inlet port;

b) allowing the dirty liquid in the first inner chamber portion to flow through the filtering device to form clean liquid in the outer chamber, leaving waste in the first inner chamber portion, whereby pressure in the first inner chamber portion will rise as the filtering device gradually becomes obstructed;

c) moving the piston towards the second limit position to increase the size of the first inner chamber portion and to free a clean filtering device portion in the first inner chamber portion upon the pressure in the first inner chamber portion reaching a determined value, whereby the pressure in the first inner chamber portion will remain approximately equal to said determined value;

d) allowing waste liquid in the second inner chamber portion to be evacuated through the second waste liquid outlet port only when the pressure in the second inner chamber portion is equal to or greater than an outlet threshold pressure value;

e) upon the piston reaching the second limit position, allowing the pressure in the first inner chamber portion to rise beyond said determined value;

f) upon an inlet threshold pressure value being reached in the first inner chamber portion, preventing dirty liquid to flow into the first inner chamber portion and allowing dirty liquid to flow into the second inner chamber portion through the second inlet port;

g) allowing the dirty liquid in the second inner chamber portion to flow through the filtering device to form clean liquid in the outer chamber, leaving waste in the second inner chamber portion, whereby pressure in the second inner chamber portion will rise as the filtering device gradually becomes obstructed;

h) moving the piston towards the first limit position to increase the size of the second inner chamber portion and to free a clean filtering device portion in the second inner chamber portion upon the pressure in the second inner chamber portion reaching a determined value, whereby pressure in the second inner chamber portion will remain approximately equal to said determined value;

i) allowing waste liquid in the first inner chamber portion to be evacuated through the first waste liquid outlet port only when the pressure in the first inner chamber portion is equal to or greater than the outlet threshold pressure value;

j) upon the piston reaching the first limit position, allowing the pressure in the second inner chamber portion to rise beyond said determined value;

k) upon the inlet threshold pressure value being reached in the second inner chamber portion, preventing dirty liquid to flow into the second inner chamber portion and allowing dirty liquid to flow into the first inner chamber portion through the first inlet port;

l) repeating steps (a) to (k) until no more dirty liquid is desired to be filtered; and m) continuously collecting clean liquid from the outer chamber through the clean liquid outlet port.

2. A self-cleaning filter for filtering incoming dirty liquid and distinctly recuperating clean liquid and waste liquid, comprising:

a housing having an elongated inner chamber defining first and second inner chamber portions, and an outer chamber;

a filtering device mounted to said housing and separating said inner and outer chambers, for allowing dirty liquid in said inner chamber to be filtered by flowing through said filtering device to form clean liquid in said outer chamber, leaving waste in said inner chamber;

first and second inlet ports in said housing for allowing dirty liquid to flow respectively into said first and second inner chamber portions;

a clean liquid outlet port in said housing for allowing clean liquid to flow out of said outer chamber;

first and second waste outlet ports in said housing for allowing waste liquid to flow respectively out of said first and second inner chamber portions;

a piston longitudinally movable along said inner chamber between a first and a second limit position and engaging said filtering device for cleaning said filtering device of waste as said piston moves, said piston separating said first and second inner chamber portions whereby said first and second inner chamber portions have a variable dimension depending on the position of said piston;

a control device;

first and second inlet control valves controlled by said control device and respectively linked to said first and second inlet ports for controlling liquid flow through said first and second inlet ports;

first and second outlet control valves controlled by said control device and respectively linked to said first and second waste outlet ports for controlling liquid flow through said first and second waste outlet ports; and first and second pressure sensors linked to said control device and respectively located in said first and second inner chamber portions for measuring the pressure in said first and second inner chamber portions;

wherein said piston will move through said inner chamber in a reciprocating motion for expelling waste liquid alternately through said first and second waste outlet ports upon determined pressure differentials being reached between said first and second inner chamber portions, and wherein said control device will control the openings of said first and second inlet control valves and of said first and second outlet control valves so as to create desired pressure differentials in said first and second inner chambers to ensure a reciprocating motion of said piston in said inner chamber to clean said filtering device and to ensure expulsion of waste liquid through said first and second waste outlet ports.

3. A self-cleaning filter as defined in claim 2, wherein said filtering device is a filtering screen.

4. A self-cleaning filter as defined in claim 3, wherein said filtering screen comprises a rigid perforated support structure and a porous film applied against said support structure.

5. A self-cleaning filter as defined in claim 3, wherein said inner chamber is cylindrical and is circumscribed by said filtering screen which is also cylindrical, said outer chamber being located around said inner chamber, being toroidal and being circumscribed by said housing which is also cylindrical.

6. A self-cleaning filter as defined in claim 2, wherein said piston is generally cylindrical and comprises a filtering device engaging peripheral surface and a pair of opposite end surfaces that are inwardly concave.

7. A self-cleaning filter as defined in claim 6, wherein said piston comprises an axial channel defining two extremities and axially extending through said piston, and a plunger movable in said axial channel and having a pair of opposite seats, with either one of said seats being engageable against a corresponding said piston end surface to close a corresponding said axial channel extremity, said piston further comprising at least one radial channel radially extending through said piston between said axial channel and said peripheral surface.

8. A self-cleaning filter as defined in claim 2, wherein said piston comprises a pair of opposite frusto-conical, outwardly convex, back-to-back surfaces linked at a common annular filtering device engaging edge.

9. A self-cleaning filter as defined in claim 8, wherein said piston further comprises a pair of stabilizers on opposite sides thereof.

* * * * *